United States Patent
Fluman et al.

(10) Patent No.: US 10,608,435 B2
(45) Date of Patent: *Mar. 31, 2020

(54) CONTINUOUSLY BALANCING MULTIPLE PHASES OF A POWER GRID

(71) Applicant: International Business Machines Corporation, Armonk, NY (US)

(72) Inventors: Mudi M. Fluman, Haifa (IL); Yaacov Frank, Houston, TX (US); Igor Nabutovsky, Beit-Shemesh (IL); Yehuda Shiran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,609

(22) Filed: Mar. 6, 2018

(65) Prior Publication Data

US 2018/0198281 A1 Jul. 12, 2018

Related U.S. Application Data

(63) Continuation of application No. 14/982,252, filed on Dec. 29, 2015, now Pat. No. 9,997,916.

(51) Int. Cl.
*H02J 3/26* (2006.01)
*G06F 1/26* (2006.01)
(Continued)

(52) U.S. Cl.
CPC ............ *H02J 3/26* (2013.01); *G05B 15/02* (2013.01); *G05F 1/66* (2013.01); *G06F 1/26* (2013.01);
(Continued)

(58) Field of Classification Search
CPC ........ H02J 3/14; H02J 3/26; H02J 3/28; H02J 3/34; H02J 3/381; H02J 2003/003;
(Continued)

(56) References Cited

U.S. PATENT DOCUMENTS 8,700,225 B2 4/2014 Pratt et al.
8,788,106 B2 7/2014 Stothers et al.
(Continued)

FOREIGN PATENT DOCUMENTS

CN 102055202 A 5/2011
CN 102394501 A 3/2012
(Continued)

OTHER PUBLICATIONS

List of IBM Patents or Patent Applications Treated as Related, Filed Mar. 6, 2018, 2 pages.
(Continued)

*Primary Examiner* — Crystal J Barnes-Bullock
(74) *Attorney, Agent, or Firm* — David B. Woycechowsky (57) ABSTRACT

Intermittently re-distributing power from three phases of a power grid connected to power consuming components of a data center by configuring power supply units (PSUs) which are integrated into each enclosure, two PSUs per enclosure. The distribution is determined by machine logic to: (i) meet the predicted power requirements of the power consuming components of the data center, and (ii) the use of first phase, second phase and third phase electrical powers is at least approximately in balance.

6 Claims, 8 Drawing Sheets

(51) Int. Cl.
*G06Q 50/06* (2012.01)
*G05B 15/02* (2006.01)
*G05F 1/66* (2006.01)
*H02J 3/14* (2006.01)
*H02J 3/34* (2006.01)
*H02J 3/28* (2006.01)
*H02J 3/38* (2006.01)
*H02J 3/00* (2006.01)

(52) U.S. Cl.
CPC ............ *G06Q 50/06* (2013.01); *H02J 3/14* (2013.01); *H02J 3/28* (2013.01); *H02J 3/34* (2013.01); *H02J 3/381* (2013.01); *H02J 2003/003* (2013.01); *Y04S 10/54* (2013.01)

(58) Field of Classification Search
CPC ......... G05F 1/66; G05B 15/02; G06Q 50/06; Y04S 10/54; G06F 1/26
See application file for complete search history.

(56) References Cited

U.S. PATENT DOCUMENTS

| | | | |
|---|---|---|---|
| 9,281,689 B2 | 3/2016 | Boardman et al. | |
| 9,373,957 B2 | 6/2016 | Alshinnawi et al. | |
| 9,520,043 B1* | 12/2016 | Alshinnawi | G08B 21/182 |
| 9,531,191 B2 | 12/2016 | Belur et al. | |
| 9,728,971 B2 | 8/2017 | Robertazzi et al. | |
| 9,991,719 B2 | 6/2018 | Krolak et al. | |
| 10,008,951 B2* | 6/2018 | Kaukojarvi | H02J 3/26 |
| 10,218,179 B2* | 2/2019 | Kocarev | G06Q 10/06 |
| 10,261,535 B2* | 4/2019 | Boardman | H02J 3/26 |
| 2010/0060289 A1 | 3/2010 | Wiedenbrug et al. | |
| 2012/0175951 A1* | 7/2012 | Pamulaparthy | H02J 3/26 307/11 |
| 2012/0316691 A1 | 12/2012 | Boardman et al. | |
| 2013/0218497 A1 | 8/2013 | Stanlake | |
| 2013/0325376 A1 | 12/2013 | Turicchi, Jr. et al. | |
| 2013/0328309 A1 | 12/2013 | Fujii et al. | |
| 2015/0295508 A1* | 10/2015 | Conry | H02M 5/4585 363/37 |
| 2015/0365007 A1 | 12/2015 | Kaukojarvi et al. | |
| 2017/0093161 A1 | 3/2017 | Kocarev et al. | |
| 2017/0185121 A1 | 6/2017 | Fluman et al. | |
| 2017/0343592 A1 | 11/2017 | Zhang et al. | |

FOREIGN PATENT DOCUMENTS

| | | | | |
|---|---|---|---|---|
| CN | 102709927 A | | 10/2012 | |
| CN | 202888836 U | | 4/2013 | |
| JP | 2012147662 A | * | 8/2012 | ............... H02J 3/26 |
| JP | 5068792 B2 | | 11/2012 | |
| WO | 2013070237 A1 | | 5/2013 | |

OTHER PUBLICATIONS

Bragard et al., "The Balance of Renewable Sources and User Demands in Grids: Power Electronics for Modular Battery Energy Storage Systems", IEEE Transactions on Power Electronics, vol. 25, No. 12, Dec. 2010, pp. 3049-3056.

* cited by examiner

| INITIAL POWER DISTRIBUTION TABLE (PHASES UN-BALANCED) |||||
|---|---|---|---|---|
| ENCLOSURE | TOTAL POWER | PHASE A | PHASE B | PHASE C |
| 4ac1 | 100 | 50 | | 50 |
| 4ac2 | 200 | 100 | | 100 |
| 4ac3 | 300 | 150 | | 150 |
| 4ac4 | 400 | 200 | | 200 |
| 4ac5 | 500 | 250 | | 250 |
| 4ab1 | 600 | 300 | 300 | |
| 4ab2 | 700 | 350 | 350 | |
| 4ab3 | 700 | 350 | 350 | |
| 4bc1 | 1000 | | 500 | 500 |
| 4bc2 | 1200 | | 600 | 600 |
| TOTAL | 5700 | 1750 | 2100 | 1850 |

| SURPLUS / DEFICIT TABLE ||||
|---|---|---|---|
| PHASE | POWER LOAD | DESIRED POWER LOAD (TO BALANCE PHASES) | SURPLUS (DEFICIT) |
| A | 1750 | 1900 | (150) |
| B | 2100 | 1900 | 200 |
| C | 1850 | 1900 | (50) |
| TOTAL | 5700 | 5700 | 0 |

FIRST BALANCING ITERATION TABLE
(TRANSFER 150W FROM PHASE B TO PHASE A)

| ENCLOSURE | TOTAL POWER | BEFORE TRANSFER | | PROPORTION OF ENCLOSURE POWER OUT OF ALL 4ab ENCLOSURES | POWER TRANSFERRED | AFTER TRANSFER | |
|---|---|---|---|---|---|---|---|
| | | PHASE A | PHASE B | | | PHASE A | PHASE B |
| 4ab1 | 600 | 300 | 300 | 600 / 2000 = 3 / 10 | 150 × 3 / 10 = 45 | 345 | 255 |
| 4ab2 | 600 | 350 | 350 | 700 / 2000 = 7 / 20 | 150 × 7 / 20 = 52.5 | 402.5 | 297.5 |
| 4ab3 | 700 | 350 | 350 | 700 / 2000 = 7 / 20 | 150 × 7 / 20 = 52.5 | 402.5 | 297.5 |
| TOTAL | 2000 | 1000 | 1000 | | 150 | 115.0 | 850 |

FIG. 7A

FIRST BALANCING ITERATION SUMMARY TABLE

| ENCLOSURE | TOTAL POWER | BEFORE TRANSFER | | | TRANSFER 150W | | | AFTER TRANSFER | | |
|---|---|---|---|---|---|---|---|---|---|---|
| | | PHASE A | PHASE B | PHASE C | PHASE A | PHASE B | PHASE C | PHASE A | PHASE B | PHASE C |
| 4ac1 | 100 | 50 | | 50 | | | | 50 | | 50 |
| 4ac2 | 200 | 100 | | 100 | | | | 100 | | 100 |
| 4ac3 | 300 | 150 | | 150 | | | | 150 | | 150 |
| 4ac4 | 400 | 200 | | 200 | | | | 200 | | 200 |
| 4ac5 | 500 | 250 | | 250 | | | | 250 | | 250 |
| 4ab1 | 600 | 300 | 300 | | 45 | -45 | | 345 | 255 | |
| 4ab2 | 700 | 350 | 350 | | 52.5 | -52.5 | | 402.5 | 297.5 | |
| 4ab3 | 700 | 350 | 350 | | 52.5 | -52.5 | | 402.5 | 297.5 | |
| 4bc1 | 1000 | | 500 | 500 | | | | | 500 | 500 |
| 4bc2 | 1200 | | 600 | 600 | | | | | 600 | 600 |
| TOTAL | 5700 | 1750 | 2100 | 1850 | 150 | -150 | | 1900 | 1950 | 1850 |

FIG. 7B

SECOND BALANCING ITERATION TABLE
(TRANSFER 50W FROM PHASE B TO PHASE C)

| ENCLOSURE | TOTAL POWER | BEFORE TRANSFER | | PROPORTION OF ENCLOSURE POWER OUT OF ALL 4bc ENCLOSURES | POWER SHIFTED | AFTER TRANSFER | |
|---|---|---|---|---|---|---|---|
| | | PHASE B | PHASE C | | | PHASE B | PHASE C |
| 4bc1 | 1000 | 500 | 500 | 1000 / 2200 = 5/11 | 50 × 5 / 11 = 22.73 | 477.27 | 522.73 |
| 4bc2 | 1200 | 600 | 600 | 1200 / 2200 = 6/11 | 50 × 6 / 11 = 27.27 | 572.73 | 627.27 |
| TOTAL ENCLOSURES | 2200 | 1100 | 1100 | | 50 | 1050 | 1150 |

FIG. 8A

SECOND BALANCING ITERATION SUMMARY TABLE

| ENCLOSURE | TOTAL POWER | BEFORE TRANSFER | | | TRANSFER 50W | | | AFTER TRANSFER | | |
|---|---|---|---|---|---|---|---|---|---|---|
| | | PHASE A | PHASE B | PHASE C | PHASE A | PHASE B | PHASE C | PHASE A | PHASE B | PHASE C |
| 4ac1 | 100 | 50 | | 50 | | | | 50 | | 50 |
| 4ac2 | 200 | 100 | | 100 | | | | 100 | | 100 |
| 4ac3 | 300 | 150 | | 150 | | | | 150 | | 150 |
| 4ac4 | 400 | 200 | | 200 | | | | 200 | | 200 |
| 4ac5 | 500 | 250 | | 250 | | | | 250 | | 250 |
| 4ab1 | 600 | 345 | 255 | | | | | 345 | 255 | |
| 4ab2 | 700 | 403 | 298 | | | | | 402.5 | 297.5 | |
| 4ab3 | 700 | 403 | 298 | | | | | 402.5 | 297.5 | |
| 4bc1 | 1000 | | 500 | 500 | | -22.73 | 22.73 | | 477.27 | 522.73 |
| 4bc2 | 1200 | | 600 | 600 | | -27.27 | 27.27 | | 572.73 | 627.27 |
| TOTAL | 5700 | 1900 | 1950 | 1850 | | -50 | 50 | 1900 | 1900 | 1900 |

FIG. 8B

| ENCLOSURE | TOTAL POWER | BEFORE BALANCING | | | POWER TRANSFERRED | | | AFTER BALANCING | | |
|---|---|---|---|---|---|---|---|---|---|---|
| | | PHASE A | PHASE B | PHASE C | PHASE A | PHASE B | PHASE C | PHASE A | PHASE B | PHASE C |
| 4ac1 | 100 | 50 | | 50 | | | | 50 | | 50 |
| 4ac2 | 200 | 100 | | 100 | | | | 100 | | 100 |
| 4ac3 | 300 | 150 | | 150 | | | | 150 | | 150 |
| 4ac4 | 400 | 200 | | 200 | | | | 200 | | 200 |
| 4ac5 | 500 | 250 | | 250 | | | | 250 | | 250 |
| 4ab1 | 600 | 300 | 300 | | 45 | −45 | | 345 | 255 | |
| 4ab2 | 700 | 350 | 350 | | 52.5 | −52.5 | | 402.5 | 297.5 | |
| 4ab3 | 700 | 350 | 350 | | 52.5 | −52.5 | | 402.5 | 297.5 | |
| 4bc1 | 1000 | | 500 | 500 | | −22.73 | 22.73 | | 477.27 | 522.73 |
| 4bc2 | 1200 | | 600 | 600 | | −27.27 | 27.27 | | 572.73 | 627.27 |
| TOTAL | 5700 | 1750 | 2100 | 1850 | 150 | −200 | 50 | 1900 | 1900 | 1900 |

COMPLETE BALANCING PROCESS SUMMARY TABLE — 900

CONTINUOUSLY BALANCING MULTIPLE PHASES OF A POWER GRID

BACKGROUND

The present invention relates generally to the field of multi-phase power distribution, and more particularly to equalizing (balancing) the magnitudes of power delivered by the phases.

A data center typically hosts lots of servers arranged in vertical racks. Typically, the servers in a single rack are related in a certain way and the servers in each rack, taken collectively, make up a "system." A data center may include components other than servers. The term "enclosure" is used herein as a generic term to mean any type of electrically-powered component of a data center (for example, a server). The enclosures in a data center are ultimately powered by a power distribution infrastructure (typically including one, or more, power grids), which may supply electrical power in single phase form, or in a three-phase (Delta or Wye, depending on the geography) form.

When using a three-phase power grid, it is typically considered important to, at least somewhat, balance electrical power consumption, by the loads, among the three phases. Typically, if the load on a first phase of a three phase power source will go over a predetermined limit for a single phase, then the data center will not be able to add more three-phase loads to the power grid, even in the case that the second and third phases of the three phase power source are lightly loaded.

Many data centers are subject to a "phase-related redundancy requirement" as follows: (i) each enclosure receives its power from two redundant power supply units (PSUs); (ii) the two PSUs supplying power to an enclosure can each supply 100% of the power required by the enclosure; and (iii) each of two PSUs supplying power to an enclosure is connected to a different phase of the power supply grid.

SUMMARY

According to an aspect of the present invention, there is a computer implemented method, computer program product and/or computer system for use in a data center that includes a first set of enclosure(s) that receives electrical power from the first and second phases, a second set of enclosure(s) that receives electrical power from the first and third phases, a third set of enclosure(s) that receives electrical power from the second and third phases, and power control hardware for controlling relative proportions of power supplied by the first, second and third phases. The method, product and/or system performs the following operations (not necessarily in the following order): (i) receiving predicted power requirements, for a predetermined time interval, for the first, second and third sets of enclosures; (ii) calculating a power distribution for the first, second and third phases so that: (a) the predicted power requirements are met, and (b) the use of first phase, second phase and third phase electrical powers is at least approximately in balance; and (c) configuring power control hardware to effect the calculated power distribution at a start of the predetermined time interval.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of this disclosure provide a method to balance the three phases of a power grid that feeds a set of power consuming load(s) (that is, enclosure(s)) in a data center. The enclosure(s) can be divided into sets so that each "set of enclosure(s)" is redundantly powered (in the sense of "phase-related redundancy") by the same two phases of power from the power grid. A "set of enclosure(s)" may be limited to power consuming components installed on a single physical rack in the data center. On the other hand, a "set of enclosure(s)" may also include enclosures residing on separate racks, but still fed by the same two phases from the same power grid nonetheless.

Some embodiments of this disclosure are based on the phase-related redundancy requirement set forth above in the Background section of this document.

Some embodiments of this disclosure are based on a software feature that sets the power level supplied by each PSU. Presented as a percentage of the full load on the enclosure, the power level of each PSU can be set to any value between 0% and 100%. By default, each PSU will supply 50% of the load on the enclosure. It is further assumed that each enclosure's operating system supports a command to set the level of the PSU load, according to the method which will be further discussed in the following paragraph.

Because each PSU can supply 100% of the load consumed by a given data center load, the two PSUs supplying power to the enclosure must share the load when both PSUs are in operation. Expressed as a percentage of the full load consumed by the enclosure, the power supplied by each PSU can be set to any value between 0% and 100%. By default, each PSU supplies 50% of the power to the data center load. In some embodiments of the present invention, the operating system of each enclosure has the ability to set the level of power received from each PSU (that is, to set the proportion of its total power consumption that it receives from each of the PSUs from which it receives power).

Some embodiments of the present invention may include one, or more, of the following features, characteristics and/or advantages: (i) apparatus and method that continuously balances three phases of a three-phase power grid (or all phases of any multi-phase power grid) connected to a single system; (ii) proportionally divides surplus power of one phase, among all relevant enclosures, and moves individual surplus amounts to one or more phase(s) in deficit;

and/or (iii) upon achieving balance of one phase, repeats the process to balance the remaining unbalanced phases.

Figure 1:
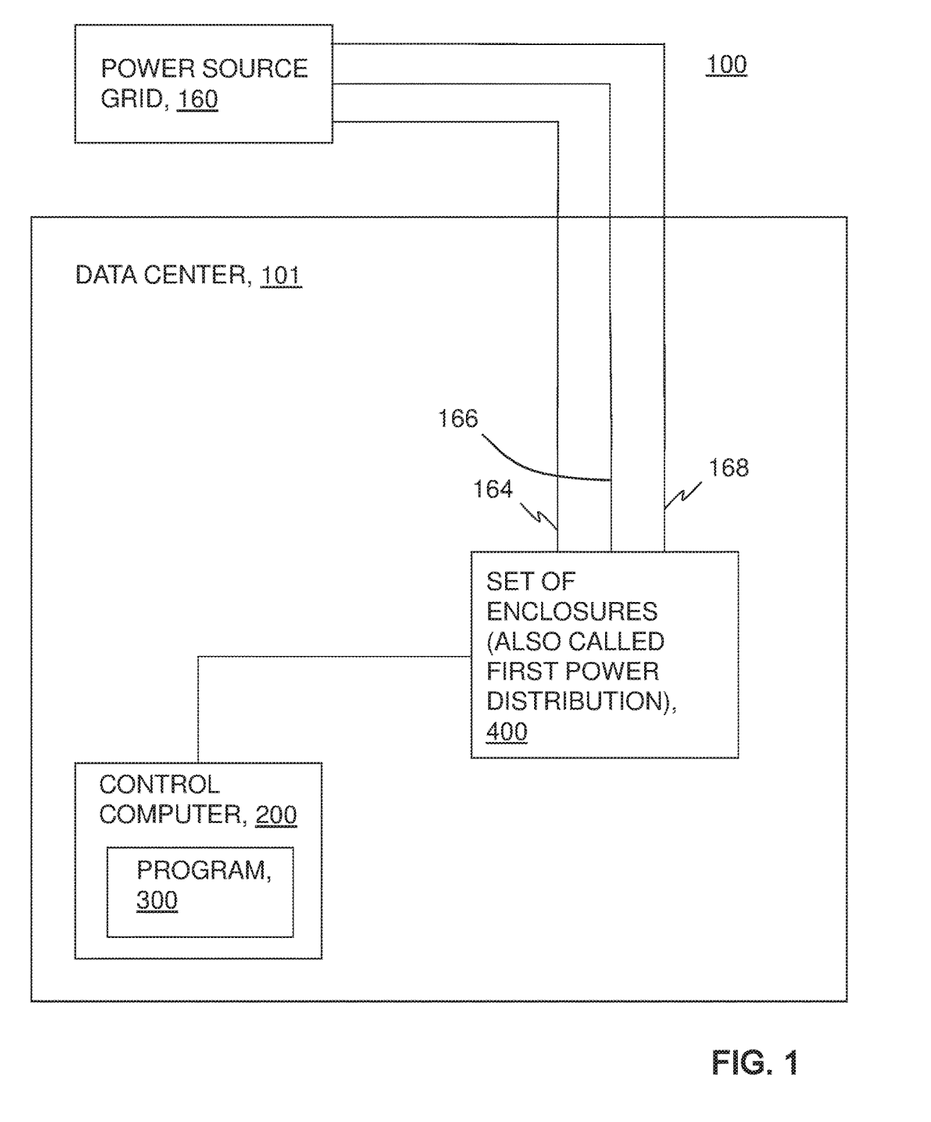
FIG. 1 is a block diagram view of a first embodiment of a system according to the present invention.
Figure 3:
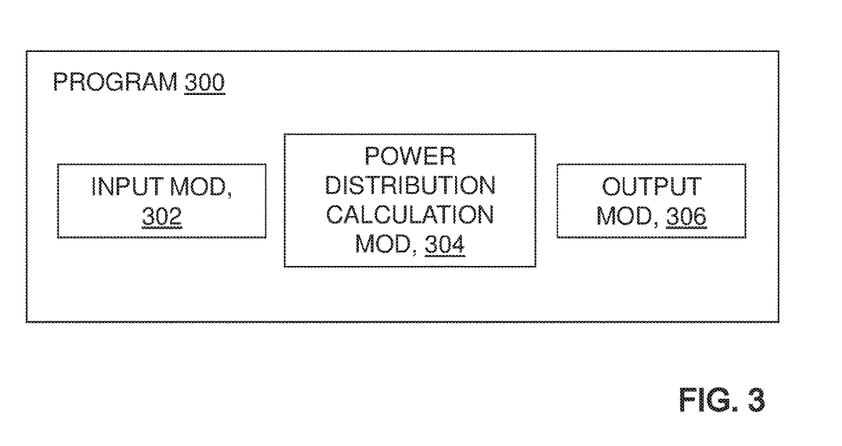
FIG. 3 is a block diagram showing a machine logic (for example, software) portion of the first embodiment system.
Figure 4:
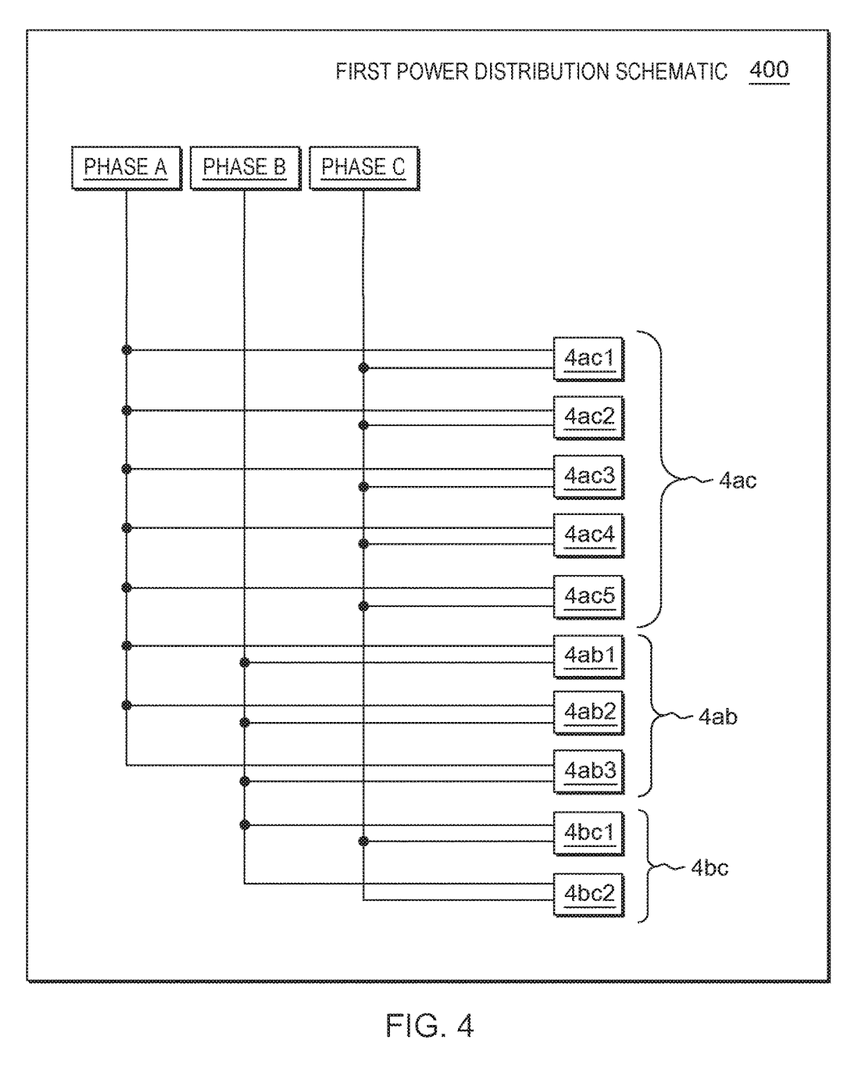
FIG. 4 is a schematic of a portion of a data center included in the first embodiment system.

As shown in FIGS. 1, 3 and 4, system 100 includes: data center 101 and power source grid 160. Data center 101 includes phase A power transmission line 164; phase B power transmission line 166; and phase C power transmission line 168; control computer 200 (including program 300); and set of enclosures (also called first power distribution, also called enclosures set) 400. Program 300 includes: input module (mod) 302; power distribution calculation mod 304; and output mod 306. First power distribution 400 includes: phases A, B, and C; enclosures 4ac1 through 4ac5 (collectively, set of enclosure(s) 4ac); enclosures 4ab1 through 4ab3 (collectively, set of enclosure(s) 4ab); and enclosures 4bc1 and 4bc2 (collectively, set of enclosure(s) 4bc). In this embodiment, each enclosure includes a pair of PSUs (not separately shown), with each pair of PSUs being respectively connected to two different phases.

Figure 2:
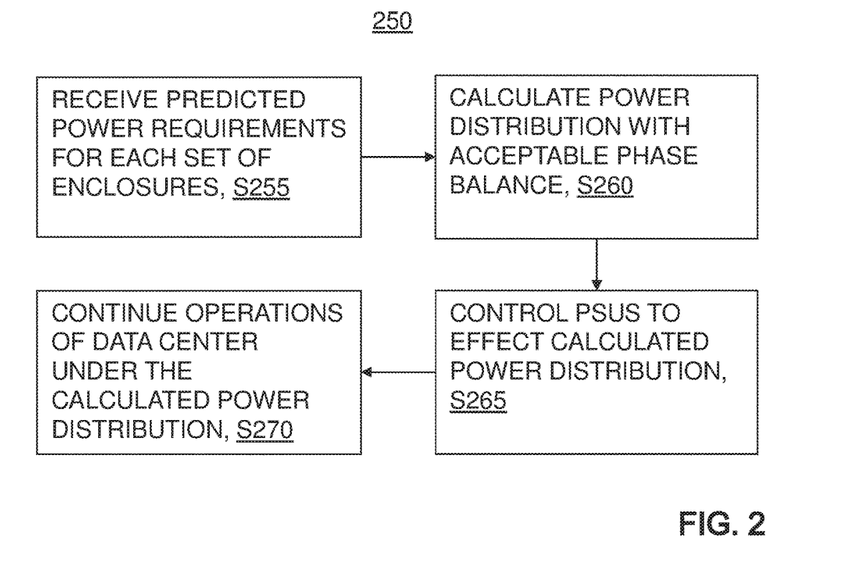
FIG. 2 is a flowchart showing a first embodiment method performed, at least in part, by the first embodiment data center power supply environment.

As shown in FIG. 2, according to method 250 the PSUs of enclosures set 400 are configured, and periodically reconfigured, so that the three phases of electrical power (respectively received through lines 164, 166, 168) will be at least approximately in balance. In this document, "approximately" in balance means that the three phases are substantially closer to being in a perfect balance (that is, used equally) than under conventional approaches where each pair of PSUs connected to a common set of enclosure(s) provides electrical power in equal measure to that set of enclosure(s).

Processing of method 250 begins at operation S255, where input mod 302 of program 300 (see FIG. 3) receives predicted power requirements for each enclosure in the data center with respect to a future predetermined time interval (for example, the next hour of operation).

Processing proceeds to operation S260, where power distribution calculation mod 304 (see FIG. 3) calculates the amounts of power that should be respectively supplied by each one of the two PSUs in each enclosure so that: (i) the predicted power requirements are met, and (ii) the use of first phase, second phase and third phase electrical powers is at least approximately in balance. More detailed examples of these calculations will be set forth and discussed, below.

Processing proceeds to operation S265, where output mod 306 controls the PSUs of set of enclosures 400 to effect the power distribution calculated at operation S260. In this embodiment, the operating system of each server computer enclosure sets the calculated power distribution in accordance with output data received from output mod 306. In this embodiment, the "power control hardware" includes control computer 200 and the pair of PSUs (no separate reference number) integrally built into each enclosure 4 (see enclosures $4ac_1$ to $4bc_2$ in FIG. 4). It is this "power control hardware" that effects the phase-balanced power distribution calculated at operation S260.

Processing proceeds to operation S270, where set of enclosures 400 is operated, for some time interval, under the power distribution effected to operation S265. Near the end of this time interval, method 250 will repeat based on any updated information about: (i) power consumption of various enclosures; and/or (ii) added/subtracted enclosures.

A numeric example will now be presented to describe a method of balancing three phases (A, B, and C,) in some embodiments of the present invention. Schematic 400 shows a distribution of power from a three-phase power grid to a set of enclosures. Enclosures 4ac each receive power from phases A and C. Enclosures 4ab each receive power from phases A and B. Enclosures 4bc each receive power from phases B and C. As mentioned above, in this embodiment, each enclosure includes two PSUs, each connected to a different phase.

Power consumption values for enclosures 4ac1 through 4ac5 are 100 W (Watts), 200 W, 300 W, 400 W, and 500 W (Watts), respectively. Power consumption values for enclosures 4ab1 through 4ab3 are 600 W, 700 W, and 700 W, respectively. Power consumption values for enclosures 4bc1 and 4bc2 are 1000 W, and 1200 W, respectively.

Figure 5:
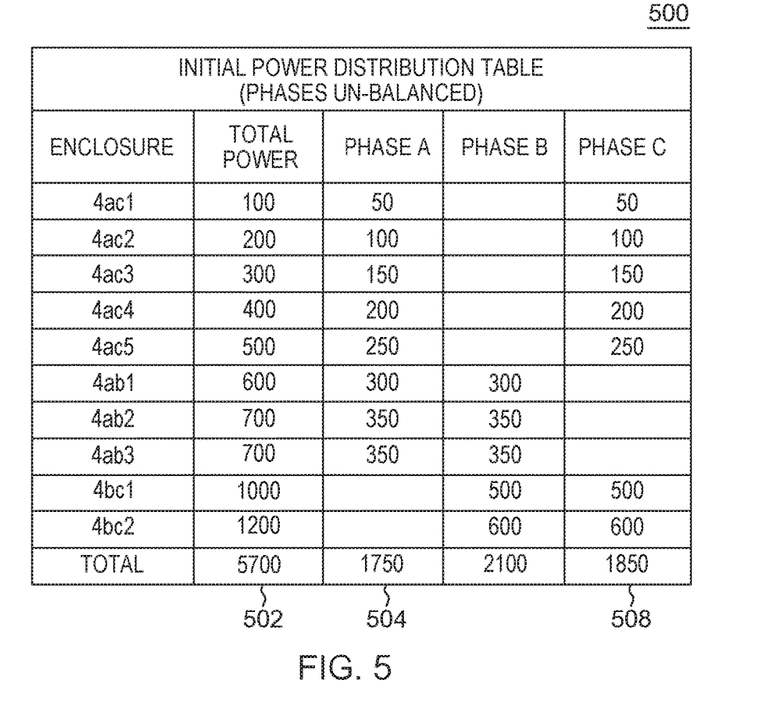
FIG. 5 is a table showing information that is helpful in understanding embodiments of the present invention.

As shown in columns 502, 504, and 508 of initial power distribution table 500 of FIG. 5, power to each enclosure is initially supplied equally from two phases that supply the enclosure. For example, of 100 W supplied to enclosure 4ac1, 50 W comes from phase A and 50 W comes from phase C. The respective relations are shown for all the enclosures listed in the table.

The total load of all enclosures is 5700 W. To achieve balance among the phases, each of the three phases should supply 1900 W (⅓ of the total load).

Figure 6:
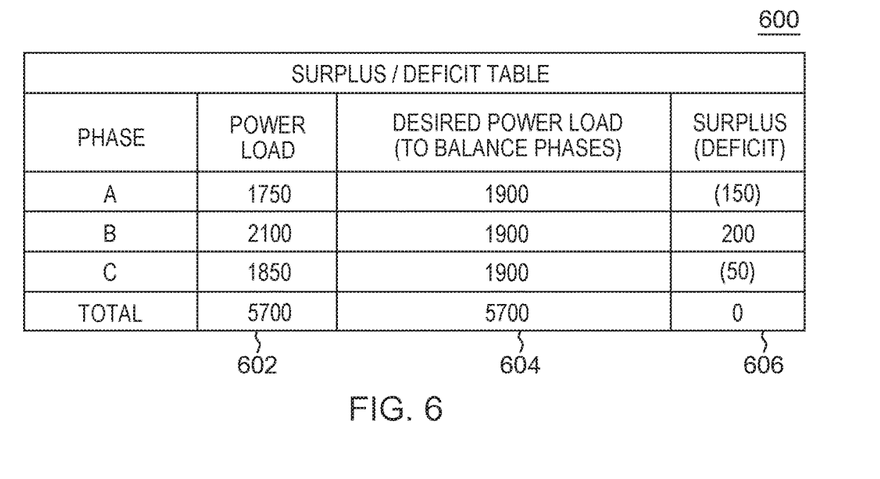
FIG. 6 is a table showing information that is helpful in understanding embodiments of the present invention.

As shown in surplus/deficit table 600 of FIG. 6, power load (column 602) is the power initially supplied by the three phases before balancing takes place. Desired power load (column 604) is the power that will be supplied by each phase when balance is achieved at the conclusion of the current example. Initial surplus or deficit condition of each phase is given in column 606.

The balancing example, according to some embodiments of the present invention, begins. The surplus power supplied phase B (200 W) will be shifted to phases A and C. Stated differently, the surplus workload initially carried by phase B will be picked up by phases A and C. One phase in deficit (phase A in this example) and one phase in surplus (phase B) are selected. Connected to these two phases are enclosures 4ab1, 4ab2 and 4ab3 (see first power distribution schematic 400 of FIG. 4).

Because the deficit of phase A is 150 W (see FIG. 6), only 150 W, of the 200 W surplus of phase B, will be shifted to phase A. These 150 W are to be distributed among enclosures 4ab1, 4ab2 and 4ab3 in proportion to their respective power consumptions as shown in first balancing iteration table 700 of FIG. 7A. The total power (2000 W) consumed by enclosures 4ab1 through 4ab3 is shown in column 704. As shown in columns 705 and 706, it can be seen that, for example, enclosure 4ab1 draws 300 W each from phases A and B for a total of 600 W. As the computations given in column 707 show, power consumption of enclosure 4ab1 (600 W) equals 600/2000, or 3/10 of the total consumption of enclosures 4ab1 through 4ab3. Of the 150 W to be transferred from phase B to A, (150 W×3/10)=45 W will be transferred to phase A, as the computation given in columns 708 shows.

Figure 7A:
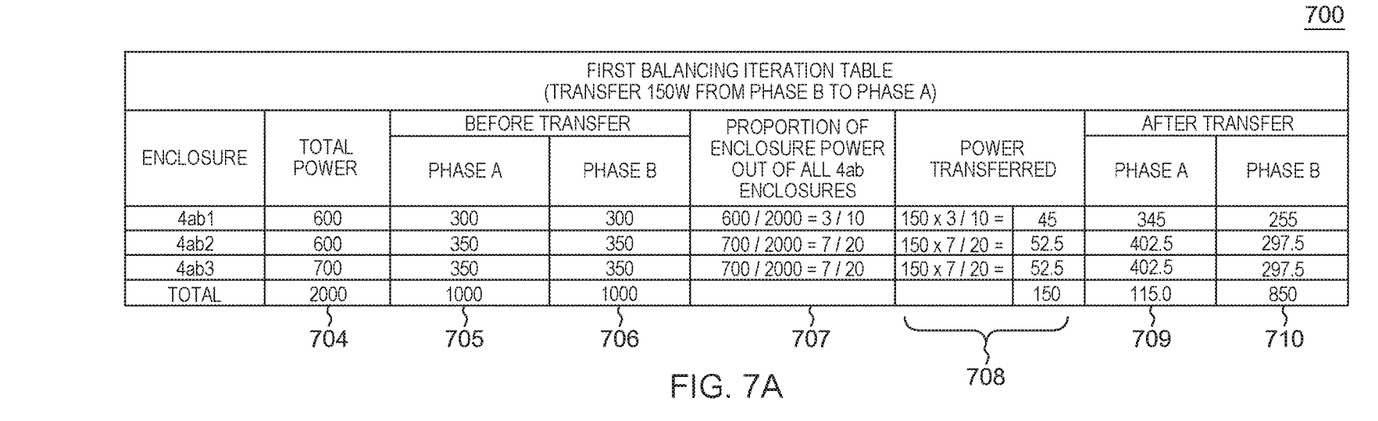
FIG. 7A is a first balancing iteration table showing information that is helpful in understanding embodiments of the present invention.

As shown in columns 705 and 709, power drawn from phase A by enclosure 4ab1 has increased from 300 W to 345 W. Correspondingly, as shown in columns 706 and 710, power drawn from phase B by enclosure 4ab1 has decreased from 300 W to 255 W.

Figure 7B:
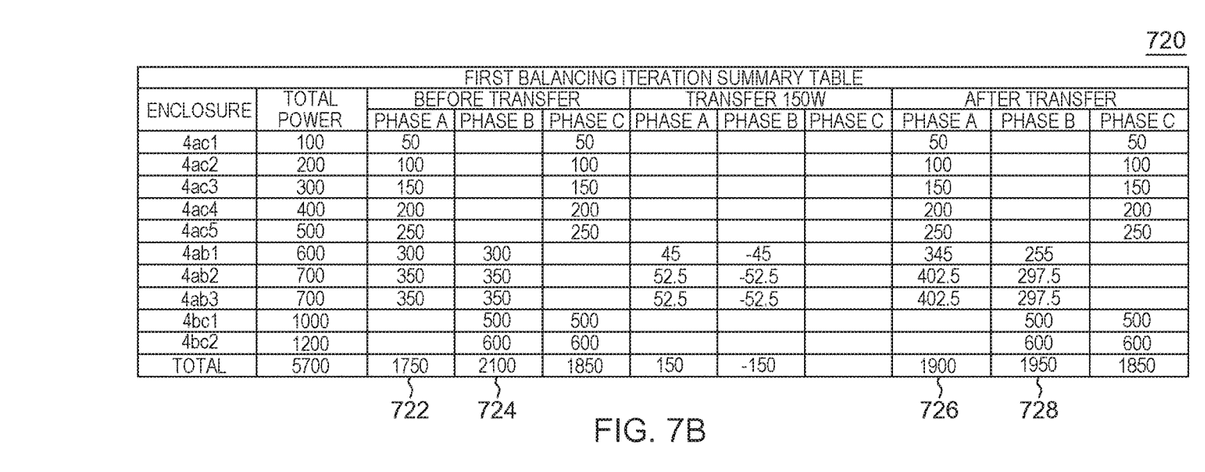
FIG. 7B is a first balancing iteration summary table showing information that is helpful in understanding embodiments of the present invention.

As shown in first balancing iteration summary table 720 of FIG. 7B, phase A has picked up 150 W (see columns 722 and 726) and phase B has shed 150 W (see columns 724 and 728). Phase A is now balanced at 1900 W and phase B is now at 1950 W, still with 50 W surplus.

Figure 8A:
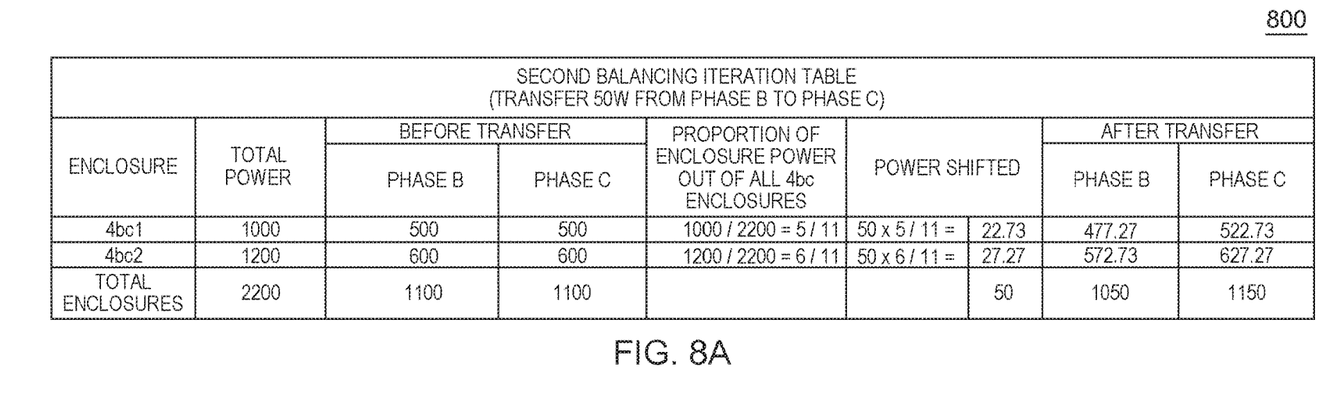
FIG. 8A is a second balancing iteration table showing information that is helpful in understanding embodiments of the present invention.
Figure 8B:
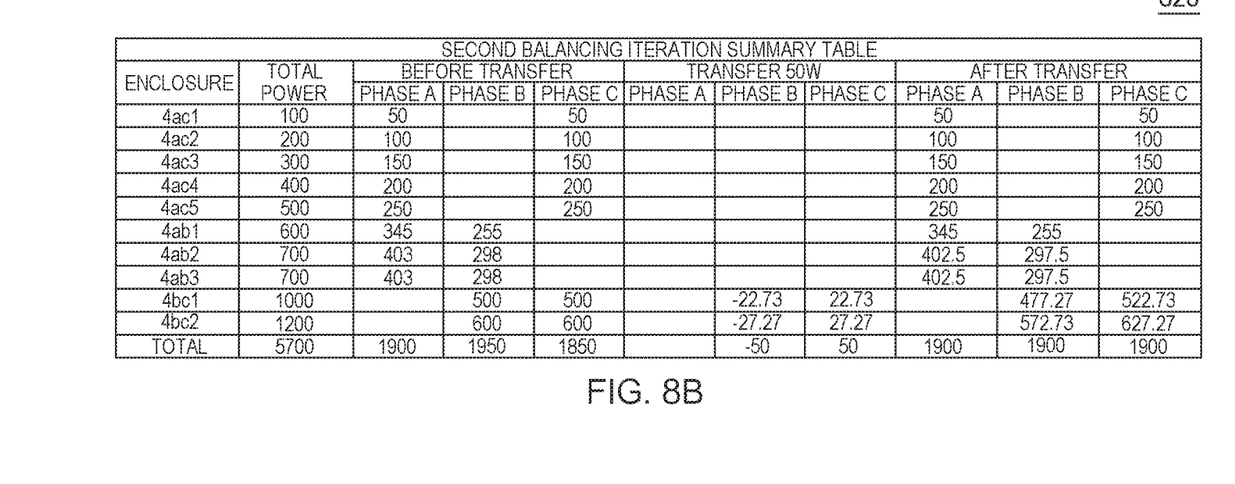
FIG. 8B is a second balancing iteration summary table showing information that is helpful in understanding embodiments of the present invention.

The procedure is then repeated in a second balancing iteration, where again one phase in deficit (phase C) and one phase in surplus (phase B) are selected. As shown in second balancing iteration table 800 of FIG. 8A and summarized in second balancing iteration summary table 820 of FIG. 8B, the remaining 50 W surplus of phase B has been shifted to phase C.

Figure 9:
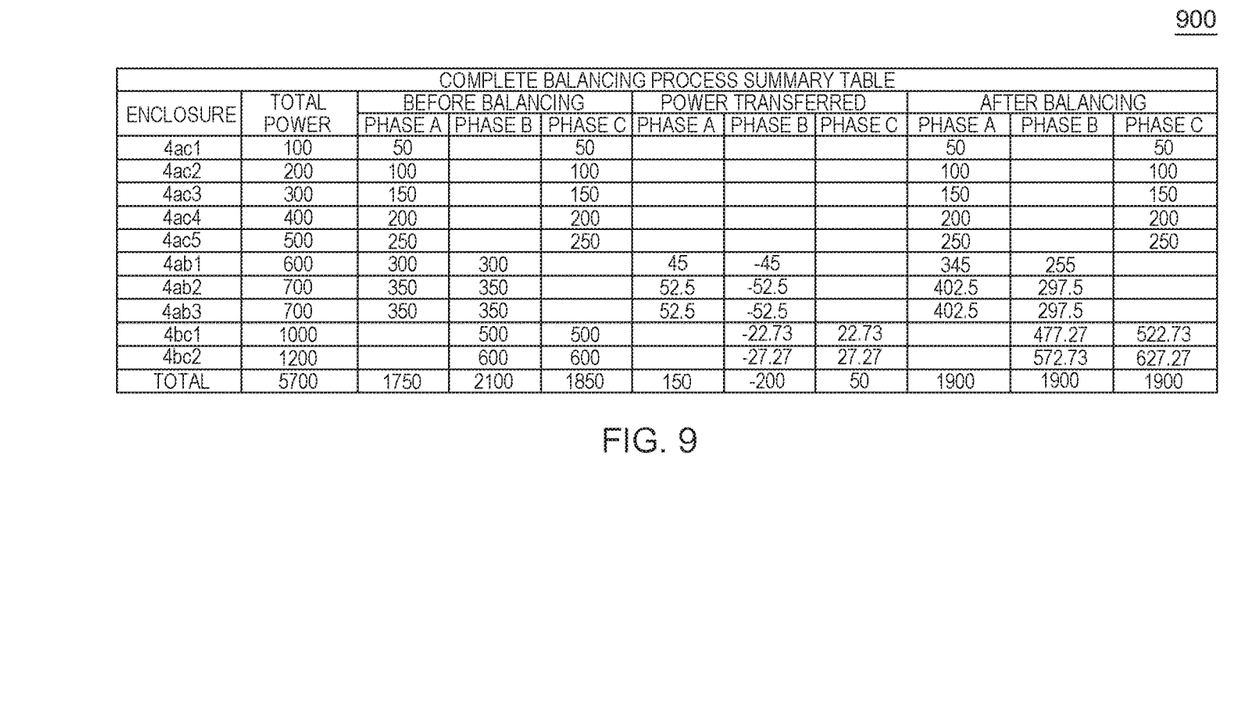
FIG. 9 is a complete balancing process summary table showing information that is helpful in understanding embodiments of the present invention.

The example concludes with all three phases in balance. The power distribution across all enclosures are now as summarized in complete balancing process summary table 900 of FIG. 9.

The procedure in the example above will now be generalized in the algorithm given below. While the generalized algorithm to follow considers a three-phase power distribution configuration for simplicity herein, the algorithm can be further generalized and applied to any multiphase (or polyphase) power distribution configuration.

Objective: Given a plurality of enclosures connected to three phases, (A, B, and C), where each enclosure is connected to two different phases, set the power of each enclosure/phase combination such that the total load is equally balanced between the three phases. Stated differently, the objective is to distribute power from the three phases to the enclosures such that each phase delivers substantially the same total power to the enclosures.

Figure 10:
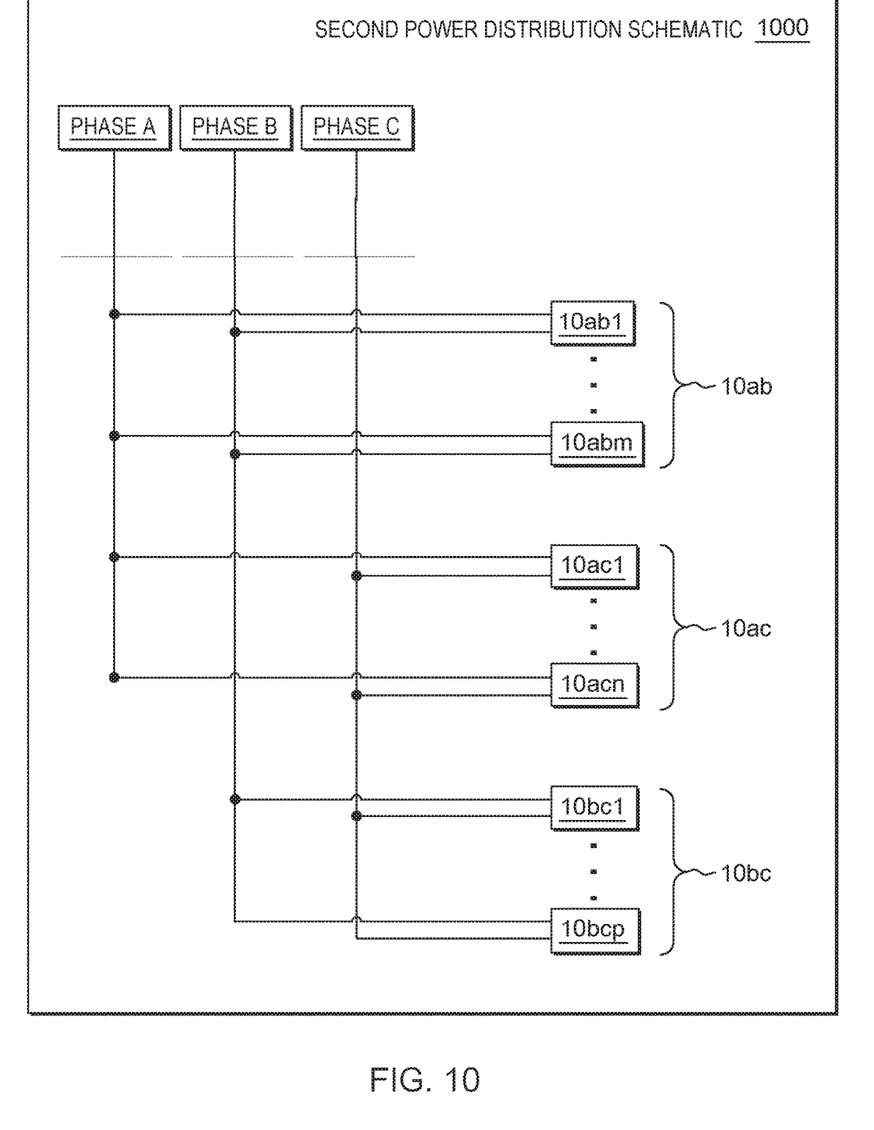
FIG. 10 is a schematic of an embodiment of a portion of a data center according to the present invention.

As shown in second power distribution schematic 1000 of FIG. 10, the following nomenclature will be used:

Enclosures 10ab, including enclosures 10ab1 through 10abm, denote enclosures connected to phases A and B. Total number of such enclosures is m.

Enclosures 10ac, including enclosures 10ac1 through 10acn, denote enclosures connected to phases A and C. Total number of such enclosures is n.

Enclosures 10bc, including enclosures 10bc1 through 10bcp, denote enclosures connected to phases B and C. Total number of such enclosures is p.

WX (XYz)=Power of phase X connected to enclosure XYz, where X and Y can be A, B, or C.

WX (XY)=Power of phase X connected to all enclosures XY, where X and Y can be A, B, or C.

WX=Total power of phase X (all connected enclosures)
W=Total system power (all three phases combined)
Wd=Desired balanced power per phase
$\Delta(X)$=Surplus (+) or deficit (−) on phase X, compared with Wd.
WXY=Total power of enclosures XY.
W(XYz)=Power of Enclosure XYz Algorithm:

Step 0: Measure the total power consumption on each enclosure of the system.

Step 1: Split the power equally on each enclosure between the two phases connected to it.

Step 2: Sum up all power of phases A, B, and C.

$$WA=WA(AB)+WA(AC)$$

$$WB=WB(AB)+WA(BC)$$

$$WC=WC(AC)+WC(BC)$$

Step 2: Sum up the power on all enclosures.

$$W=WA+WB+WC$$

Step 3: Compute the desired balanced power per phase.

$$Wd=W/3$$

Step 4: Compute the deficit or surplus per phase.

$$\Delta A=WA-Wd$$

$$\Delta B=WB-Wd$$

$$\Delta C=WC-Wd$$

Step 5: Select one phase with surplus and one phase with deficit. Without loss of generality, for illustration, select phase A as being in deficit and phase B as being in surplus.

Step 6: Sum all power of enclosures ABi, where i=(1 . . . m). This value is denoted as WAB.

Step 7: Select the smallest of absolute values of AA and AB. Without loss of generality, for illustration, it is stipulated that AA has the smallest absolute value, denoted as ABS($\Delta A$).

Step 8: Divide the surplus for each enclosure ABi proportionally for all enclosures AB. Add the divided surplus to the phase in deficit (phase A), and subtract the divided surplus from the phase in surplus (phase B):

FOR every enclosure ABi DO $$WA(ABi)=WA(ABi)+ABS(\Delta A)\times W(ABi)/WAB$$

Set the power level of PSU connected to phase A of ABi to WA (ABi)

$$WA(ABi)=WA(ABi)-ABS(\Delta A)\times W(ABi)/WAB$$

Set the power level of PSU connected to phase B of ABi to WB(ABi)

END

Step 9: Update total power of phases A and B.

$$WA=WA(AB)+WA(AC)$$

$$WB=WB(AB)+WB(BC)$$

Step 10: Update deficit and surplus of phases A and B. AA should be substantially 0 upon completion of the balancing operation.

$$\Delta A=WA-Wd$$

$$\Delta B=WB-Wd$$

Step 11: Repeat steps 5 through 10 for phase B and phase C.

Step 12: Wait a predetermined length of time and repeat steps 0 through 12 to continuously rebalance the phases with changing conditions of power usage.

Some embodiments of the present invention may include one, or more, of the following features, characteristics and/or advantages: (i) concerns loads that are essentially permanently connected to relevant phases and changes the power drawn from each phase; (ii) there is no need to turn off a load to adjust the power drawn from the phases that supply its power; (iii) power adjustment (in each phase) can be as minimal as desired; (iv) power adjustments are made while both phases are connected to the load; (v) balances between phases by tuning the load's two power supply units (a PSU for each phase); (vi) simultaneously adjusts the power levels provided by two phases to a load; (vii) concerns two-phase loads; (viii) adjusts two power supply units (each PSU on a different phase) that supply a load, to achieve balance between the phases; and/or (ix) applies to any type of load.

Some definitions will be set forth in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Electrically Connected: means either directly electrically connected, or indirectly electrically connected, such that intervening elements are present; an electrical connection may include, but need not be limited to, elements such as capacitors, inductors, transformers, vacuum tubes, and the like.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A data center assembly comprising:
    a first set of enclosure(s) that receives electrical power from the first and second phases;
    a second set of enclosure(s) that receives electrical power from the first and third phases;
    a third set of enclosure(s) that receives electrical power from the second and third phases; and
    power control hardware for controlling relative proportions of power supplied by the first, second and third phases;
    wherein the power control hardware is structured, programmed and connected to perform the following operations:
        receiving predicted power requirements, for a predetermined time interval, for the first, second and third sets of enclosures;
        calculating a power distribution for the first, second and third phases so that: (i) the predicted power requirements are met, and (ii) the use of first phase, second phase and third phase electrical powers is at least approximately in balance; and
        configuring power control hardware to effect the calculated power distribution at a start of the predetermined time interval.

2. The assembly of claim 1 wherein:
    the power control hardware includes a plurality of power supply units (PSUs);
    each enclosure of the first, second and third sets of enclosure(s) includes two PSUs of the plurality of PSUs; and
    the two PSUs of each enclosure receive power of different phases.

3. The assembly of claim 1 wherein the first, second, and third sets of enclosure(s) are structured, programmed and connected to operate such that they receive electrical power according to the calculated power distribution during the predetermined time interval.

4. The assembly of claim 1 wherein the power control hardware is further structured, programmed and connected to perform the following operation:
    near the end of the predetermined time interval, repeating the receiving, calculating and configuring operations.

5. The assembly of claim 1 wherein the configuration of the power control hardware is performed without shutting down any enclosures of the first, second and third sets of enclosures.

6. The assembly of claim 1 wherein the amount of first phase, second phase and third phase electrical power consumed are all equal.

* * * * *